UNITED STATES PATENT OFFICE.

THOMAS MILLEN, OF SYRACUSE, NEW YORK.

IMPROVEMENT IN THE MANUFACTURE OF ARTIFICIAL STONE.

Specification forming part of Letters Patent No. 150,177, dated April 28, 1874; application filed February 28, 1874.

*To all whom it may concern:*

Be it known that I, THOMAS MILLEN, of Syracuse, New York, have invented certain Improvements in the Manufacture of Artificial Stone, of which the following is a specification:

In the manufacture of artificial stone it has been put, after molding, into close chambers, and the products of combustion from charcoal were introduced by means of certain apparatus connected therewith. From an extended practice on a large scale I have found that this method of curing or hardening the stone is very defective and inefficient. It does not penetrate sufficiently, and the surface of the stone has a dull coarse look, very objectionable, and its durability is very imperfect.

I have, after long and expensive experiment, at last discovered a sufficient remedy for the imperfections above named, and I am now enabled to penetrate the stone to a sufficient depth, render it much harder than by the former processes, produce bright and smooth surfaces, quite unlike any artificial stone before known, and thus add greatly to its value, and make it much cheaper.

By my process I place the stone, after it is molded, in a close chamber, into which, to produce the best effects, light should be introduced through a glazed window. Into this chamber I convey certain compound gases (sulphate of carbon, or hydrated sulphate of carbon) made by burning, in any convenient apparatus, charcoal and sulphur, and mingling the products of their united combustion with highly heated or decomposed steam, which I generally produce by causing water to drop in small quantity upon an iron plate directly over the fire.

This is a simple and cheap way of producing the desired gases; but it is of course well known to the practical chemist that there are other ways as effective.

The compound gases enter the chamber containing the molded stone in a highly-heated state, and penetrate into the stone, rendering it very hard and durable, and impermeable to water to a considerable depth; sufficient to resist frost or atmospheric changes for out-of-door work in a more perfect manner than has ever before been attained within my knowledge, and the surface has a peculiar brightness and smoothness never before effected.

Having thus fully described my improved method of curing artificial stone, I claim—

1. The treating artificial stone with the combined gases of carbon and sulphur, herein set forth, in a close chamber, substantially in the manner and for the purposes described.

2. The employment of a close chamber lighted by means of a window therein, to aid the effect of the gases upon the stone, as specified.

THOMAS MILLEN.

Witnesses:
J. J. GREENOUGH,
R. WOOLWORTH.